3,118,772
ARTIFICIAL SWEETENING COMPOSITION
Fritz Locher, Bottmingen, and Paul Mueller, Basel, Switzerland, assignors to Ciba Corporation, a corporation of Delaware
No Drawing. Filed May 2, 1961, Ser. No. 107,063
Claims priority, application Switzerland May 3, 1960
4 Claims. (Cl. 99—141)

The present invention provides mixtures of salts of N-cyclohexylsulfamic acid suitable for the preparation of concentrated aqueous solutions of this sweetening agent, as well as the aqueous solutions themselves and mixtures containing said salt mixtures in the dry or wet form, and a method of preparing said salt mixtures and solutions.

The mixtures of the present invention contain the sodium salt and calcium salt of N-cyclohexylsulfamic acid (sodium and calcium cyclamate) in the proportion of 1:0.2 to 1:4 by weight. Within these limits the proportions can be varied according to the temperature at which the solutions are to be prepared stored or used. A preferred proportion is 1:1.2 to 1:0.5 by weight especially at a temperature ranging from 0–25° C. Instead of the anhydrous calcium cyclamate there may be used a corresponding amount of calcium cyclamate containing 2 mols of water of crystallization.

The salt mixtures and their solutions are prepared in the usual manner, for example by mixing the constituents or dissolving the salts in water or in aqueous solutions. The aqueous concentrates contain 10–30% of the salt mixture.

N-cyclohexylsulfamic acid and its salts, more especially the sodium salt and calcium salt, are known as artificial sweetening agents. Like saccharine—to which they are however superior as far as taste is concerned—they are used wherever sugar is not suitable for sweetening, for example in certain dietary foods, and in the manufacture of medicaments. It is a disadvantage of the use of cyclamates that they are relativley sparingly soluble in water at low temperatures. This is particularly true of sodium cyclamate which is preferable to calcium cyclamate because of the pure sugarlike taste of its aqueous solutions. At temperatures below 24° C. calcium cyclamate is better soluble but its aqueous solutions have a flat after-taste.

The present invention is based on the surprising observation that the aforementioned mixtures of the sodium and calcium salts of N-cyclohexylsulfamic acid are better soluble than the individual salts by themselves and also better than the sodium cyclamate and that the taste of aqueous solutions of such salt mixtures is substantially the same as that of sodium cyclamate. These salt mixtures are, therefore, excellently suitable for the preparation of concentrated aqueous cyclamate solutions. An important temperature range for the aqueous concentrates ready for use (commercial forms) is more especially the range from 0 to 12° C. It has been observed that below 12° C. maximum solubility is achieved with mixtures of 1 part by weight of sodium cyclamate and about 1.1 parts by weight of anhydrous calcium cyclamate or 1.2 parts by weight of calcium cyclamate containing 2 mols of water of crystallization. Above 12° C. up to about 25° C. maximum solubility is reached with a mixture containing 1 part by weight of sodium cyclamate and about 0.92 part by weight of anhydrous calcium cyclamate.

The increase in solubility is evidenced, for example, by the fact that at 24° C., the solubility of the mixture shows an increase of about 55% compared with its constituents whose solubility at this temperature is substantially equal. In the particularly important temperature range of +10 to 0° C. the increase in solubility is about 40–45% compared with that of sodium cyclamate. This solubility is substantially greater than the solubility of pure calcium cyclamate.

The mixtures prepared according to the present invention are suitable, for example, for making concentrated aqueous solutions having a sweetening power such as could be obtained hitherto, for example, only by adding saccharine which as is known has certain disadvantages. However, this does not exclude the possibility of adding to the cyclamate mixtures according to the invention, if desired, a small proportion of other artificial sweetening agents and/or dietary sweetening agents, for example arabitol or sorbitol; the latter may also serve as moisture retaining agents, for example instead of glycerol.

To preserve preparations containing such mixtures of cyclamates there may be further added preservatives such as benzoic acid and/or para-hydroxybenzoic acid esters, for example their methyl or propyl ester.

Mixtures according to the present invention containing anhydrous sodium cyclamate and calcium cyclamate containing water of crystallization are further distinguished by the fact that they have very good free flowing properties and are not tacky so that it is particularly easy to work them up in the dry state on an industrial scale.

Such mixtures of cyclamates are advantageously added to preparations of all descriptions that should contain, or not exceed, a certain amount of liquid and with which the increased solubility achieved by the present invention can be utilized, for example for the better penetration of stewed fruit or fruit preserves and in tabletting compositions or syrups, and furthermore quite generally to achieve a higher concentration of sweetening agent.

The principle of the present method is further described in the following examples.

*Example 1*

A mixture of 10.0 grams of sodium cyclamate and 12.0 grams of calcium cyclamate containing 2 mols of water of crystallization is dissolved in 99 cc. of deionized water. When the solution is cooled to 0° to +2° C. no crystallization is yet observed.

*Example 2*

10.0 grams of sodium cyclamate and 11.0 grams of calcium cyclamate of 100% dry content are dissolved in 100 cc. of deionized water. When the solution is cooled to 0° to +2° C. no crystallization is yet observed.

*Example 3*

12.03 grams of sodium cyclamate and 5.92 grams of calcium cyclamate of 100% dry content (or 6.46 grams of calcium cyclamate containing 2 mols of water of crystallization) are dissolved in 100 cc. (or 99.5 cc. respectively) of deionized water. When the solution is cooled to about 2° C., no crystallization is yet observed.

*Example 4*

18.0 grams of sodium cyclamate and 18.0 grams of calcium cyclamate containing 2 mols of water of crystallization (or 16.5 grams of calcium cyclamate of 100% dry content) are just soluble in 98.5 cc. (or 100 cc. respectively) of deionized water at about 24° C.

The solubility of this mixture of cyclamates exceeds that of its constituents by about 55%.

*Example 5*

10.0 grams of powdered sodium cyclamate and 12.0 grams of powdered calcium cyclamate containing 2 mols of water of crystallization (dry content 91.7%) are mixed homogeneously. The resulting mixture has a dry content of 95.45%. Calculated for a dry content of 100% it has in the important temperature range of 0° to +10° C. a solubility increased by about 45–40% compared with the solubility of sodium cyclamate.

What is claimed is:

1. A composition essentially comprising, as the sweetening agent, sodium cyclamate and calcium cyclamate in the proportions of 1:0.2 to 1:4 by weight.

2. A composition essentially comprising, as the sweetening agent, sodium cyclamate and calcium cyclamate in the proportions of 1:0.5 to 1:1.2 by weight.

3. A composition essentially comprising (1) a mixture of sodium and calicum cyclamate and (2) an aqueous solution thereof, wherein the sodium cyclamate and the calcium cyclamate are present in the proportions of 1:0.2 to 1:4 by weight.

4. A composition essentially comprising (1) a mixture of sodium and calcium cyclamate and (2) an aqueous solution thereof, wherein the sodium cyclamate and the calcium cyclamate are present in the proportions of 1:0.5 to 1:1.2 by weight.

References Cited in the file of this patent

UNITED STATES PATENTS

| | | |
|---|---|---|
| 2,629,665 | Gordon | Feb. 24, 1953 |
| 2,876,107 | Jucaitis et al. | Mar. 3, 1959 |
| 3,011,897 | Grosvenor | Dec. 5, 1961 |